Jan. 13, 1953
B. R. HEIL
2,625,062
DRILL GUIDE
Filed Sept. 1, 1948
2 SHEETS—SHEET 1
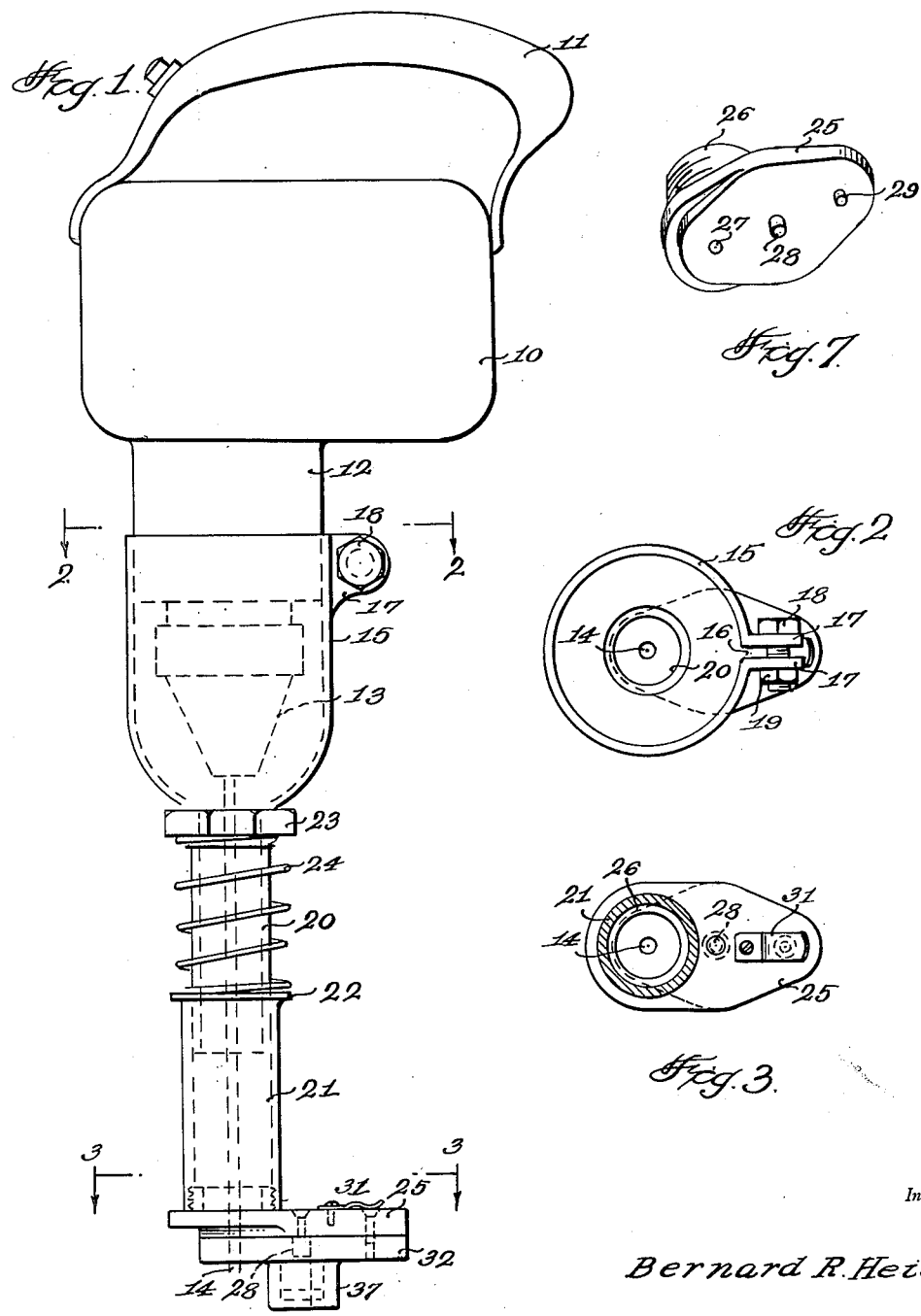
Inventor
Bernard R. Heil
By Patrick D. Beavers
Attorney Jan. 13, 1953 B. R. HEIL 2,625,062
DRILL GUIDE
Filed Sept. 1, 1948 2 SHEETS—SHEET 2
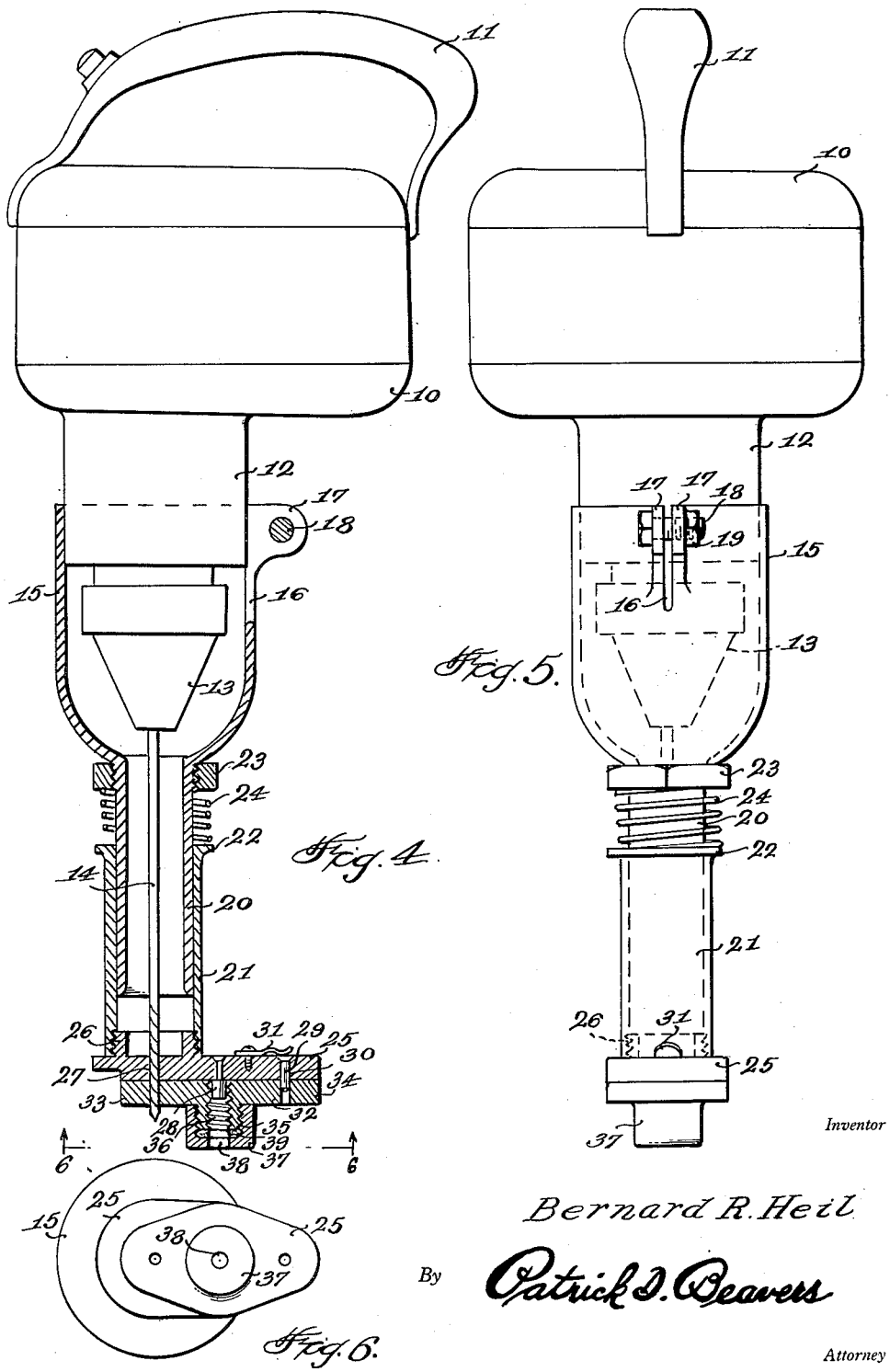
Inventor
Bernard R. Heil
By Patrick J. Beavers
Attorney Patented Jan. 13, 1953

2,625,062

UNITED STATES PATENT OFFICE 2,625,062

DRILL GUIDE

Bernard R. Heil, Los Angeles, Calif.

Application September 1, 1948, Serial No. 47,229

1 Claim. (Cl. 77—55)

The present invention relates to drill guides and it consists in the combinations, constructions and arrangements of parts herein described and claimed.

It is an object of the present invention to provide a drill guide particularly adapted for use with plate nuts such as are at present utilized in aeronautical construction for the purpose of preventing screws from becoming loose due to the excessive vibration.

Another object of the invention is the provision of a drill guide which may be quickly and easily attached to a portable drill.

Another object of the invention is the provision of a device of the character described which is simple in construction and operation and yet effective and efficient in use.

A further object of the invention is the provision in a device of the character set forth of novel means for guiding and holding a drill into proper position.

Other and further objects of the invention will become apparent from a reading of the following specification taken in conjunction with the drawings, in which:

Figure 1 is a side elevational view of an embodiment of the invention,

Figure 2 is a sectional view taken along line 2—2 of Figure 1,

Figure 3 is a sectional view taken along line 3—3 of Figure 1,

Figure 4 is a vertical sectional view of the device forming the present invention, in position upon a portable drill which is shown in elevation, Figure 5 is an elevational view taken at right angles to Figure 1, Figure 6 is a bottom plan view taken along line 6—6 in the direction of the arrows, and Figure 7 is a perspective view of an element of the invention.

Generally, there is provided a drill guide which is quickly and easily attachable to a portable drill by means of a simple socket and clamp arrangement in which the drill chuck is positioned and which has attached thereto a telescoping cylindrical member having a removably attached cylindrical member of identical contour to the so-called base plate of identical contour to the so-called "plate nut" and provided with a centrally disposed guide pin adapted to fit within the pilot hole of the plate nut and an eccentrically mounted spring-pressed detent which is adapted to be positioned in the first hole drilled in the plate nut whereby to act as a guide for the proper drilling of the second hole therein. The base plates and their attendant structures are interchangeable for use with varying sizes of plate nuts.

Referring more particularly to the drawings, there is shown therein a portable drill 10 having an operating handle 11 and a shaft casing 12 at the end of which is a conventional chuck 13. Drill bits 14 of various sizes and conventional structure are mounted in the chuck 13.

The present attachment consists of a socket 15 which encompasses the casing 12 and which is provided with a longitudinal slot 16 having a pair of outwardly extending ears 17 adjacent thereto and which ears are interconnected by means of a bolt 18 and nut 19.

Integrally formed with the socket 15 is a cylindrical portion 20 which is slidably mounted within a cylindrically shaped connector element 21 having an annular lip 22 at its inner end. A retainer ring 23 is threadably mounted upon the outer side of the portion 20 adjacent the socket 15 and a compression spring 24 surrounds the member 20 and the lip 22.

A base plate 25 is provided with an integrally formed circular projection 26 which is threadably connected interiorly of the outer end of the member 21.

Centrally disposed with respect to the projection 26 is an opening 27 in the plate 25. The plate is provided with a centrally disposed guide pin 28 and a detent 29 is slidably mounted in an opening 30 in the plate 25 and in a position in said plate corresponding with but diametrically opposed to the opening 27 therein. The detent 29 is held in position by means of a spring 31.

The plate nut is best illustrated in Figure 4 of the drawings and consists of a plate 32 having a pair of diametrically opposed integrally formed wings 33 and 34 and an integrally formed projection 35 having a centrally disposed threaded opening 36 therein. A cap 37 having a centrally disposed opening 38 is threadably mounted upon the projection 35 and a fiber washer 39 is held between the outer end of the projection 35 and the cap 37.

In operation, it will be seen that the socket 15 may be placed over the housing 12 and locked in position thereon by means of the bolt 18 and nut 19 and that the base plate 25 may then be positioned upon the plate nut of identical size and shape in such manner that the guide pin 28 lies in the opening or pilot hole 36 in the plate nut. Thereupon the bit 14 is brought into play and by pressing upon the handle 11 to thereby compress the spring 24 moving the member 21 inwardly upon the member 20 and allowing the bit 14 to move through the opening 27 to engage the wing 33 of the plate nut and to drill a hole therethrough. Pressure is then released upon the handle 11 thus allowing the bit 14 to be withdrawn from the hole thus drilled and from the opening 27. The device is then turned upon the nut until the detent 29 is forced into the previously drilled hole in the wing 33 by the spring 31, the guide pin meantime being allowed the remain in the pilot hole 36. Again the handle 11 is pressed and the drilling operation again performed to bore a hole in the wing 34. Obviously the positioning of the detent 29 in the one hole will guide the bit and cause the second hole to be drilled in a position diametrically opposite the first hole. It is also pointed out that breakage of drill bits is prevented to a large degree by the fact that the plate 25 abuts the plate nut when in operation and, in such position, causes the drill bit 14 to be placed only perpendicularly to the work to be drilled.

While but one form of the invention has been shown and described herein, it will be readily apparent to those skilled in the art that many minor modifications may be made without departing from the spirit of the invention or the scope of the appended claim.

What is claimed is:

In a device of the character described, the provision of a guide plate having an integrally formed pair of diametrically opposed ears, a centrally disposed guide pin affixed to one face of said plate, said plate having a drill bit-receiving opening in one ear thereof in spaced parallel relation to said pin and centrally disposed with respect to the sides of said ear, and a spring-pressed detent mounted in said other ear of said plate in a position diametrically corresponding to said drill bit-receiving opening in said first-mentioned ear, said detent being in spaced parallel relation to said guide pin.

BERNARD R. HEIL.

REFERENCES CITED

The following references are of record in the file of this patent:

UNITED STATES PATENTS

| Number | Name | Date |
| --- | --- | --- |
| 334,817 | Spratley | Jan. 26, 1886 |
| 647,133 | Emery | Apr. 10, 1900 |
| 793,892 | Miller et al. | July 4, 1905 |
| 1,424,941 | Perwitz | Aug. 8, 1922 |
| 1,946,421 | Brown | Feb. 6, 1934 |
| 2,210,128 | Rohr | Aug. 6, 1940 |
| 2,372,398 | Schoffner | Mar. 27, 1945 |
| 2,401,490 | Little | June 4, 1946 |
| 2,430,025 | Matthias et al. | Nov. 4, 1947 |

FOREIGN PATENTS

| Number | Country | Date |
| --- | --- | --- |
| 356,942 | Great Britain | Sept. 17, 1931 |